(12) United States Patent
Volpe, Jr. et al.

(10) Patent No.: US 6,535,810 B2
(45) Date of Patent: Mar. 18, 2003

(54) SYSTEM AND PROCESS FOR DETECTION OF WEAK CYLINDERS IN A DIESEL ENGINE

(75) Inventors: Rocco Volpe, Jr., Keavy, KY (US); James Kostrubanic, Erie, PA (US); Robert Douglas Cryer, Erie, PA (US); Ajith Kuttannair Kumar, Erie, PA (US); Vince Dunsworth, Edinboro, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/086,350

(22) Filed: Feb. 28, 2002

(65) Prior Publication Data

US 2002/0116115 A1 Aug. 22, 2002

Related U.S. Application Data

(63) Continuation of application No. 09/788,737, filed on Feb. 20, 2001.
(60) Provisional application No. 60/183,214, filed on Feb. 17, 2000.

(51) Int. Cl.[7] ........................ F02M 65/00; G01M 15/00
(52) U.S. Cl. ......................................... 701/114; 73/116
(58) Field of Search ..................... 701/33, 114, 123; 73/112, 113, 116, 119 A

(56) References Cited

U.S. PATENT DOCUMENTS

| | | | |
|---|---|---|---|
| 5,819,714 A | 10/1998 | Bush et al. | 123/673 |
| 5,868,116 A * | 2/1999 | Betts et al. | 73/116 |
| 5,884,603 A | 3/1999 | Matsuki | 123/333 |
| 6,002,980 A | 12/1999 | Taylor et al. | 701/110 |
| 6,055,468 A * | 4/2000 | Kaman et al. | 701/33 |
| 6,082,187 A | 7/2000 | Schricker et al. | 73/116 |
| 6,199,007 B1 | 3/2001 | Zavarehi et al. | 701/111 |
| 6,216,668 B1 * | 4/2001 | Haugen | 73/116 |

* cited by examiner

Primary Examiner—Andrew M. Dolinar
(74) Attorney, Agent, or Firm—Keith J. Murphy; Carl A. Rowold

(57) ABSTRACT

A system for detecting conditions indicative of substandard performance of cylinders in a diesel engine includes an engine control unit disposed in operable communication with the engine and a computer disposed in informational communication with the engine control unit. The engine control unit is in operable communication with the engine through a communication element. The system measures the required fuel with all cylinders operating and enables a recommendation to be made with respect to corrective or maintenance measures that should be undertaken with respect to the cylinder. A method for utilizing the system includes comparing fuel requirements of the engine operating under power of all cylinders and under the successive arrest of each of the cylinders. The process is repeated until each cylinder is individually removed and all of the data can be compiled and considered to determine the performance of each individual cylinder.

31 Claims, 4 Drawing Sheets

SYSTEM AND PROCESS FOR DETECTION OF WEAK CYLINDERS IN A DIESEL ENGINE

CROSS REFERENCE TO RELATED APPLICATION

This application is a continuation of and claims the benefit of U.S. patent application Ser. No. 09/788,737, filed Feb. 20, 2001, which claims the benefit of U.S. Provisional Patent Application No. 60/183,214, filed Feb. 17, 2000, the contents of both applications being incorporated herein by reference in their entirety.

TECHNICAL FIELD

This disclosure relates to diesel engines, and, more particularly, to a system and process for detecting conditions indicative of substandard performance of the cylinders within a large scale multi-cylinder diesel engine.

BACKGROUND

Diesel engines are internal combustion devices in which high compression ratios produce auto ignition of an air/fuel mixture. In such devices, because the air/fuel mixture is ignited under a compressive force, conventional ignition processes (e.g., those utilizing spark ignition, such as that found in an Otto cycle engine) are inapplicable. Thus, fewer options for influencing the combustion method are available. Control of the engines are attained primarily through the influence of a fuel injection process and the amount of fuel injected. Differences in tolerances of the components of an engine oftentimes result in variation in the behavior of each of the individual cylinders of the engine. This variation causes less than optimum performance to be realized by the engine. Such performance is characterized by low power output as a result of weak cylinders. Operation of the engine on a weak cylinder generally results in increased fuel consumption, emission of harmful substances, vibration, excessive noise, and shortened service life.

While increased fuel consumption, emission of harmful substances, vibration, excessive noise, and shortened service life are generally indicative of a weak cylinder condition, such indicators require lengthy periods of monitoring of a large number of attributes of the engine. Direct methods of weak cylinder detection have been performed by highly skilled artisans using solely their experience-trained senses. Such methods are more characteristic of art forms than of technical diagnostic processes. In these methods, an operator of a diesel engine brings the engine up to a load and a speed and allows the engine to reach a steady state condition. Thereafter, the operator adjusts the fuel volume flowing from one of the fuel pumps to one of the cylinders. For each cylinder, the skilled operator listens to the sound emanating from the cylinder and makes a determination regarding the response of the cylinder to the changed volume of fuel being supplied. Given even a narrow range of environmental and other conditions, such a determination is generally highly subjective and open to various interpretations even by the same operator. Based on the determination itself, the operator makes a judgment as to the condition of the components of each cylinder and thereby recommends remedial or other action.

While such methods have been effective for many years, they are not the most economical, effective, or accurate means of determining the condition of diesel engines. Furthermore, they are certainly not the most time-efficient methods or a means that can be carried out with the frequency required by the operation of large scale equipment into which the diesel engine is incorporated.

SUMMARY

A method and system for overcoming the drawbacks associated with the detection of conditions indicative of substandard performance of the cylinders in a diesel engine is described herein. The system provides for diagnostic monitoring of the cylinders of the engine by monitoring the system response to the selective temporary arrest of each cylinder as the engine is maintained at a constant load and speed. The method includes making a comparison of the average fuel required per cylinder of the engine operating under the power of all cylinders and a subsequent average fuel requirement for each cylinder of the engine operating under the successive arrest of each of the cylinders or a group of cylinders (at a selected engine speed and load). The process is repeated until each cylinder is individually (or collectively) removed and operationally restored and all of the data can be compiled and considered in order to statistically rank the performance of each cylinder, thereby allowing recommendations to be made concerning corrective measures regarding cylinders that are not performing up to predetermined standards.

The system includes an engine control unit disposed in operable communication with the engine and a computer disposed in informational communication with the engine control unit. The engine control unit is in operable communication with the engine through a communication element that includes a valve. The communication element may be a wiring harness. The informational communication with the engine control unit includes a dynamic signal, which controls the amount of fuel being dispensed to each cylinder, and a feedback signal, which provides a quantitative value representative of the amount of fuel being dispensed to each cylinder. The system takes into account speed and load and measures the amount of time over which fuel is dispensed to the cylinder. The time value is compared to an associated value in a linearization or lookup table, thereby allowing a determination to be made regarding the amount of fuel required by the cylinder to maintain the speed and load. Such a determination allows a recommendation to be made with respect to desirable, remedial, or modification measures that should be undertaken with respect to the cylinder.

DETAILED DESCRIPTION

Figure 1:
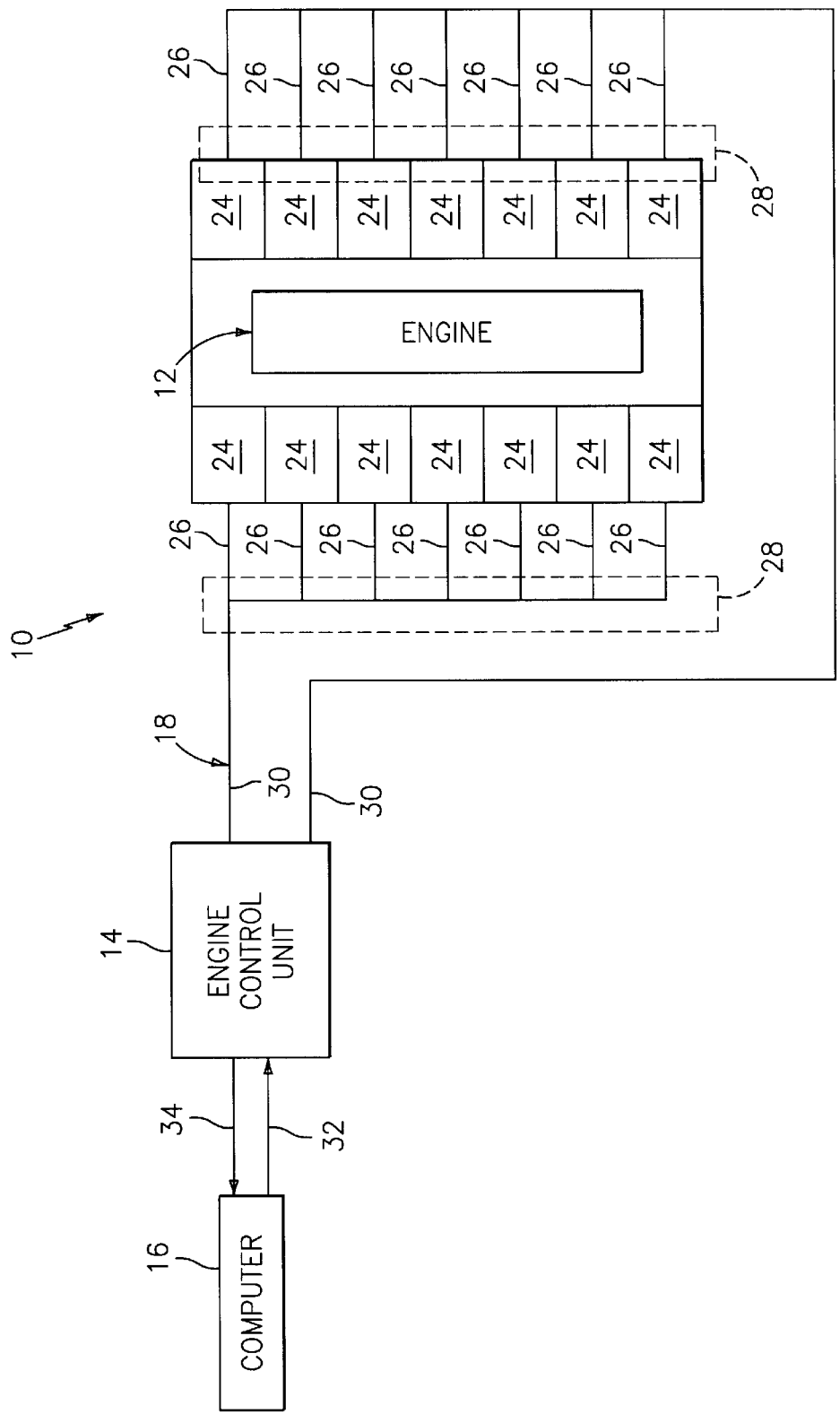
FIG. 1 is a schematic illustration of the system for the detection of conditions indicative of substandard performance of cylinders in a diesel engine.

Referring to FIG. 1, a system for the detection of conditions indicative of substandard performance of the cylinders of a diesel engine is shown generally at 10 and is hereinafter referred to as "system 10." System 10 is a diagnostic tool capable of measuring the required fuel per cylinder for an engine having all of its cylinders operational. System 10 is, furthermore, capable of temporarily arresting the operation of each individual cylinder in succession while operating in an analysis mode (i.e., while maintaining a select constant speed and load of the engine) and re-measuring the fuel requirement per cylinder of the engine with all but one cylinder (or all but a group of cylinders) functioning. The conditions detectable by system 10 are generally those indicative of weakened cylinder structure, although other conditions may be detectable. Based on the detected conditions, diagnostic recommendations pertaining to the operation of the engine can thereby be made.

System 10 comprises an engine, shown generally at 12, an engine control unit 14 in informational communication with engine 12, and a computer 16 in informational communication with engine control unit 14. Informational communication between engine 12 and engine control unit 14 is maintained through a wiring harness, shown generally at 18. Computer 16 is installed on board a motor vehicle (not shown) into which engine 12 is incorporated and is integrally configured with other control elements of engine 12. The motor vehicle may be a railway locomotive. Alternately, a portable computer (not shown) having the requisite software can be used to provide an interface between the operator and system 10.

Engine 12 comprises a plurality of cylinders 24. Typically, engine 12 comprises eight, twelve, or sixteen cylinders, although it should be understood by one of ordinary skill in the art that any number of cylinders may be assembled to form engine 12. Each cylinder 24 includes a fuel injection system (not shown) that provides the fuel required for combustion to its respective cylinder 24.

Wiring harness 18 comprises a plurality of connections 26 between each individual cylinder 24 and engine control unit 14. Each connection 26 includes a valve (not shown) disposed therein to provide control of the fuel flow to each individual cylinder 24. It should be understood by one of ordinary skill in the art that each connection 26 may be in direct communication with engine control unit 14. Each individual connection terminates in a single node 28, which is in turn maintained in communication with engine control unit 14 through a single communication element 30. As shown, wiring harness 18 includes two nodes 28, each of which are maintained in communication with engine control unit 14 through communication elements 30.

Computer 16 is communicatively connected to engine control unit 14 such that informational control can be maintained over the operation of engine control unit 14. The communicative connection between computer 16 and engine control unit 14 is characterized by a dynamic signal 32 and a feedback signal 34. Control through such signals 32, 34 provides for the monitoring of various parameters associated with the operation of engine 12. In particular, feedback signal 34 enables computer 16 to measure the time over which fuel is dispensed to each cylinder 24 through its respective fuel pump injection system while dynamic signal 32 enables computer 16 to provide control of the amount of fuel dispensed through the fuel pump injection systems. Such control is transparent to the operator. In such a manner the amount of fuel dispensed to each individual cylinder 24 can be obtained, compared to a derived value in a linearization table compiled from calibration data characteristic of the particular design of engine 12, and independently adjusted, thereby further allowing for the selective operational arrest of any cylinder 24 or combination of cylinders 24 from operation while enabling the remaining cylinders 24 of engine 12 to continue to run. Such a procedure enables information pertinent to each cylinder 24 to be received individually and interpreted collectively.

Figure 2:
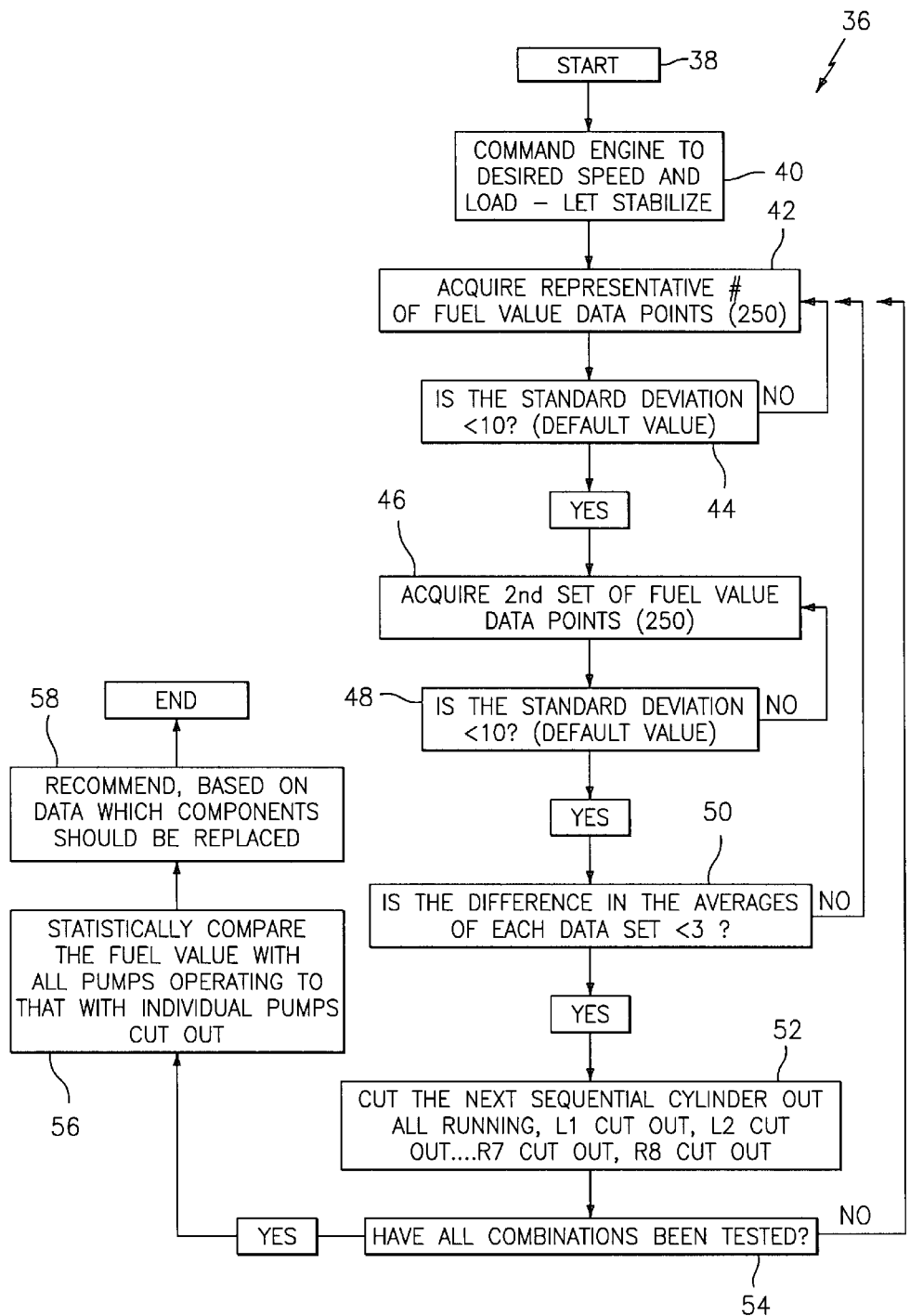
FIG. 2 is a flowchart illustrating the method of operation of the system for the detection of conditions indicative of substandard performance of cylinders in a diesel engine.

Referring now to FIG. 2, a test sequence of events by which the computer monitors and controls the engine control unit and ultimately the engine is illustrated with a flowchart, shown generally at 36. Such monitoring and control of the engine through the test sequence of events (as stated above) is transparent to the operator of the motor vehicle. As shown in flowchart 36 the test sequence is initiated with a start command 38. Start command 38 initiates a command 40 to run the engine at a specified speed and load. The specified speed and load values are selected by control software (not shown). Execution of command 40 to run the engine effectuates the stabilization of the engine at the specified speed and load values. The stabilization generally encompasses the raising of the temperatures of engine oil and water up to steady state operating temperatures.

Upon attainment of steady state operating temperatures, a testing sequence is initiated wherein fuel value readings for the engine as it operates under the power of all cylinders are obtained. Such fuel value readings correspond with fuel volumes, which are obtained from the measurement of the flow of the fuel over a time period. A first executable loop is defined by a first acquisition command 42 and a first comparison decision 44. Upon execution of first acquisition command 42 and first comparison decision 44, a first set of fuel value readings representative of the total number of fuel value readings are acquired by the computer through the engine control unit. A default value is used to define the number of readings taken for further calculations. Typically, this default value is 250. Mean and standard deviation values of the readings are calculated. The standard deviation value is compared to a first selected maximum allowable value. The first selected maximum value shown in first comparison decision 44 is 10, although any positive value can be programmed into the software code that defines the loop. If the standard deviation value is greater than the first selected maximum allowable value, then control is passed from first comparison decision 44 back to first acquisition command 42 and the first set of fuel value readings is re-collected. If, on the other hand, the standard deviation value is less than the first selected maximum allowable value, then an average of the first set of fuel valve readings is taken and stored and control is passed to a second executable loop defined by a second acquisition command 46 and a second comparison decision 48. In the second executable loop, a second set of fuel value readings is acquired by the computer. If, in a manner similar to that characteristic of the first set of fuel value readings, the standard deviation of the second set of fuel valve readings is greater than a second selected maximum value (which is the same as the first selected maximum value), then the second set of fuel valve readings is re-collected. However, as above, if the standard deviation value is less than the second selected maximum allowable value, then an average value of the second set of readings is taken.

The average values of each set of readings are then compared in an overall comparison decision 50. If the comparison of the averages is greater than a maximum selected allowable value (which is shown as being 3, although any positive value can be programmed into the software), then both sets of fuel value readings are re-collected. If the value of overall comparison decision 50 is less than the maximum selected allowable value, then control passes to a testing sequence 52 that proceeds such that fuel valve readings are obtained wherein each individual cylinder of the engine is arrested or "cut out" by having its incoming fuel flow reduced to zero, thereby causing the engine to operate on all cylinders except the one arrested while maintaining the selected speed and load. As alluded to above, groups of cylinders or "inquiry sets" that comprise one or more cylinders may also be arrested, thereby allowing the monitoring of the engine to be abbreviated. Combinations and permutations of individual cylinders and inquiry sets are arrested to provide a representation of the overall functioning of the engine. Testing sequence 52 is continued until each individual cylinder or inquiry set of cylinders has been successively arrested and restored to operation.

Upon completion of testing sequence 52, a decision 54 is executed. If, per decision 54, all cylinders have not been arrested in the engine and data obtained therefor, control is passed back to the first executable loop and the entire procedure is reinitiated. If, however, all cylinders have been successively arrested, control is passed to an analysis function 56 and the data obtained are analyzed by the computer. In analysis function 56, the amount of fuel consumption for each cylinder for the engine operating on all cylinders is statistically compared with the amounts of fuel consumption for each cylinder for the engine operating with the fuel flow to each of the various cylinders being reduced to zero. Such analysis enables the relative contribution of each cylinder to be ascertained and further used to determine the relative power output of each cylinder. Based on the data, control is passed to a recommendation function 58 wherein recommendations can be made concerning which, if any, components of the engine (particularly the cylinder components) should be replaced.

Figure 3:
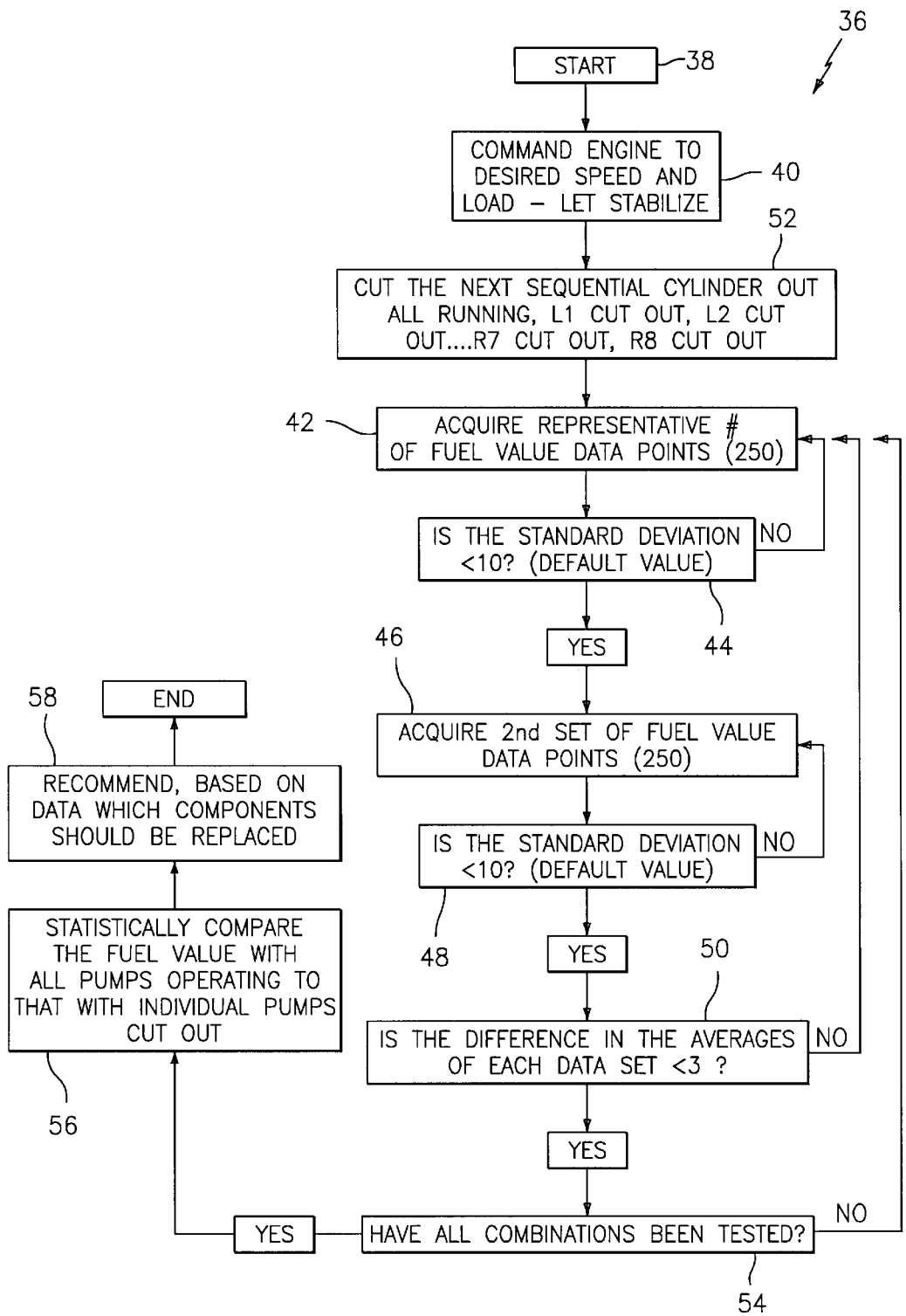
FIG. 3 is a flowchart illustrating an alternate method of operation of the system for the detection of conditions indicative of substandard performance of cylinders in a diesel engine.

Alternately, testing sequence 52 may be performed immediately subsequent to the execution of command 40. Referring now to FIG. 3, flowchart 36 is rearranged to illustrate an alternate sequence of monitoring and controlling events. In FIG. 3 control is passed to the first and second executable loops subsequent to the temporary arrest of each cylinder or inquiry set. Data values corresponding to the arrest of the cylinders or inquiry sets are stored in a register and retrieved for analysis as needed upon completion of the second executable loop and prior to decision 54.

Execution of recommendation function 58 may be at a location remote from the operation of the engine. In particular, the data obtained from analysis function 56 may be relayed by any one of a variety of means including, but not being limited to, satellite transmission to a distally located control and command center. In the event that a defective cylinder is found, the decision for maintenance can be made at the control and command center and relayed back to the engine, where it can be carried out by the operator or specified maintenance personnel.

Figure 4:
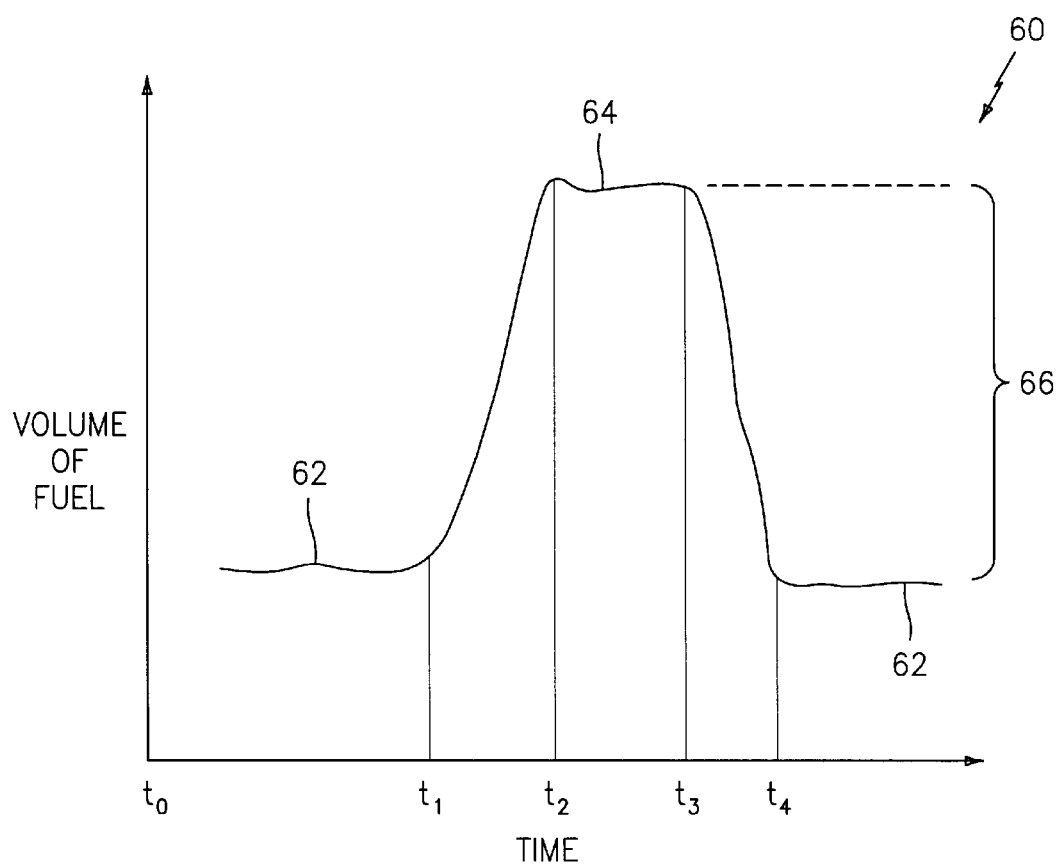
FIG. 4 is a graphical interpretation of a fuel requirement measurement of a cylinder of the engine.

Referring now to FIG. 4, a graphical interpretation of a fuel requirement measurement of a cylinder of the engine is shown generally at 60 and is hereinafter referred to as "graph 60." In graph 60, the fuel requirement of the engine per cylinder is plotted as a function of the time over which one or more cylinders are arrested. As can be seen, the fuel requirement of the engine per cylinder at a steady state value 62 is substantially constant over a period of time ($t_0$ to $t_1$) in which all cylinders of the engine are operational. When the fuel flow to one or more cylinders of the engine is restricted, thereby arresting the cylinder, the fuel requirement of the engine per cylinder increases over a period of time ($t_1$ to $t_2$) in order to compensate for the loss of power experienced as a result of the arrest of the cylinder. During a period of time ($t_2$ to $t_3$) in which the cylinder is completely arrested, the fuel requirement of the engine per cylinder reaches a new steady state value 64. A difference 66 between steady state value 62 and new steady state value 64 is the relative power contributed by one cylinder. For example, in a fourteen cylinder engine, the arrest of one cylinder yields a theoretical overall increase in total fuel consumption per cylinder of 7.14%. The introduction of fuel back into the cylinder over a period of time ($t_3$ to $t_4$) then causes the fuel requirement of the engine per cylinder with all cylinders operational to decrease back to its original steady state value 62. Upon reaching the original steady state value 62, a successive cylinder can be arrested.

A diagnostic recommendation of each cylinder can then be made based on analysis of the actual change in the fuel requirement associated with the respective cylinder. The analysis of the diagnostic recommendation may be converted into a quantifiable value from which an objective determination of the condition of the cylinder can be made. If for example, the actual increase in fuel requirement per cylinder of a fourteen cylinder engine upon arrest of a particular cylinder varies substantially from 7.14%, then an operator can conclude that the arrested cylinder is not contributing to the power output at its full potential and that it may be defective and may warrant maintenance or replacement, The analyzing method as described above may be performed when the motor vehicle is in operational travel.

While the above-described system for the detection of substandard conditions present in the cylinders of a diesel engine has been described with reference to a preferred embodiment thereof, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

What is claimed is:

1. A method of analyzing the operation of a multi-cylinder engine to identify cylinders delivering substandard performance, the method comprising:

operating the engine to attain a steady-state operating temperature;

operating the engine in an analysis mode at substantially constant speed or load;

gathering data indicative of fuel usage of the engine cylinders when the engine is operating on all cylinders in said analysis mode;

gathering data indicative of the fuel usage of the engine cylinders when the engine is operating with the operation of at least one cylinder arrested in said analysis mode until data gathering has been performed with each of the cylinders successively arrested; and analyzing said gathered data to identify the engine operations for which fuel usage was affected to a lesser degree by the arrest of cylinder operation to identify cylinders delivering substandard performance.

2. The method of claim 1 further comprising analyzing said gathered data at a site adjacent the engine.

3. The method of claim 1 further comprising transmitting said data to a remote location and analyzing said data at said remote location.

4. The method of claim 1 comprising displaying information representative of the results of the analysis of said data at a graphical user interface.

5. The method of claim 1 wherein the operation of only one cylinder at a time is arrested.

6. The method of claim 1 wherein the operation of an inquiry set of at least two cylinders at a time is arrested.

7. A method of analyzing the operation of a multi-cylinder engine to identify cylinders delivering substandard performance, the method comprising:
   operating the engine in an analysis mode at substantially constant speed or load;
   gathering data indicative of fuel usage of the engine cylinders when the engine is operating on all cylinders in said analysis mode;
   gathering data indicative of the fuel usage of the engine cylinders when the engine is operating with the operation of at least one cylinder arrested in said analysis mode until data gathering has been performed with each of the cylinders successively arrested wherein the data gathered is representative of the average fuel usage of all operating cylinders for a series of cylinder firings of a selected number; and
   analyzing said gathered data to identify the engine operations for which fuel usage was affected to a lesser degree by the arrest of cylinder operation to identify cylinders delivering substandard performance.

8. The method of claim 7 wherein the cylinder firings in said series are those that are most current in time.

9. A method of analyzing the operation of a multi-cylinder engine to identify cylinders delivering substandard performance, the method comprising:
   operating the engine in an analysis mode at substantially constant speed or load wherein the engine comprises a fuel injection system for each cylinder and wherein the duration of time during which each system delivers fuel is measured, with the duration of time being representative of the quantity of fuel delivered to the respective cylinder;
   gathering data indicative of fuel usage of the engine cylinders when the engine is operating on all cylinders in said analysis mode;
   gathering data indicative of the fuel usage of the engine cylinders when the engine is operating with the operation of at least one cylinder arrested in said analysis mode until data gathering has been performed with each of the cylinders successively arrested; and
   analyzing said gathered data to identify the engine operations for which fuel usage was affected to a lesser degree by the arrest of cylinder operation to identify cylinders delivering substandard performance.

10. A method for analyzing the performance of individual cylinders of an engine, comprising:
    maintaining the engine at at least one of a selected load and a selected speed;
    arresting and restoring one of the cylinders of the engine for a period of time until each of the cylinders of the engine have been arrested and restored while the others of the cylinders operate;
    calculating an average fuel volume required by the operating cylinders during said period of time when the one cylinder is arrested; and
    comparing said average fuel volume with an average fuel volume of each of the other cylinders.

11. The method of claim 10 further comprising making a determination of a net value of each of the cylinders.

12. The method of claim 11 wherein said determination of said net value of each of the cylinders includes making a recommendation regarding service of the cylinder based on a result obtained from said comparing of said average fuel volumes.

13. The method of claim 12 wherein said determination of said net value of each of the cylinders is made at a point remote from the engine.

14. The method of claim 12 wherein said determination of said net value of each of the cylinders is made at a point adjacent to the engine.

15. The method of claim 14 wherein said determination of said net value of each of the cylinders is a quantified value displayed on a portable test unit.

16. The method of claim 15 wherein said portable test unit is a laptop computer.

17. The method of claim 10 wherein said calculating of said average fuel volume required by the cylinder during said period of time when said cylinder is arrested comprises:
    acquiring a set of fuel value data points;
    determining a standard deviation of said set of fuel value data points; and
    comparing said standard deviation with a preselected value.

18. The method of claim 10 wherein the cylinder is an inquiry set of cylinders.

19. The method of claim 10 wherein said engine is supported on a motor vehicle.

20. The method of claim 19 wherein the method is performed when said motor vehicle is in operational travel.

21. The method of claim 19 wherein said method is performed when said motor vehicle is operationally idle.

22. A system in a vehicle with an engine for detecting conditions indicative of substandard performance of the engine while the engine is operating at a steady state and at operational temperature and while the vehicle is traveling for at least one of a set load or a set speed, the system comprising:
    an engine control unit disposed in operable communication with the engine to control the engine while the vehicle is traveling; and
    a computer disposed in informational communication with said engine control unit, the computer having the ability to communicate with the engine control unit while the vehicle is traveling.

23. The system of claim 22 wherein said engine control unit is in operable communication with the engine through a communication element.

24. The system of claim 23 wherein said communication element is in operable communication with the engine through a cylinder of the engine.

25. The system of claim 24 wherein said communication element is in operable communication with said cylinder through a fuel pump injection system.

26. The system of claim 23 wherein said communication element includes a valve.

27. The system of claim 23 wherein said communication element is a wiring harness.

28. The system of claim 22 wherein said informational communication with said engine control unit comprises:
   a dynamic signal transmitted from said computer and received by said engine control unit; and
   a feedback signal transmitted from said engine control unit and received by said computer.

29. The system of claim 28 wherein said dynamic signal controls an amount of fuel dispensed to the engine.

30. The system of claim 28 wherein said feedback signal provides a quantitative determination of an amount of fuel dispensed to the engine.

31. The system of claim 28 wherein said feedback signal comprises a quantity of discrete portions of information, each quantity of discrete information being characteristic of a corresponding cylinder of the engine.

* * * * *